Figure 1A:
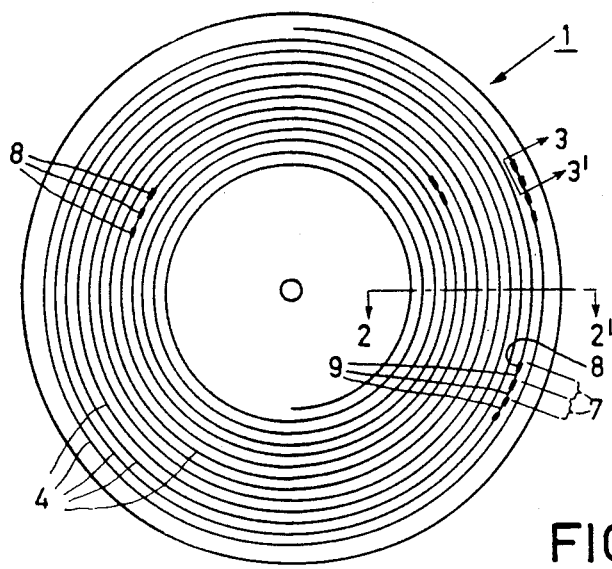

United States Patent [19]

Steenbergen et al.

[11] Patent Number: 4,872,156
[45] Date of Patent: Oct. 3, 1989

[54] RECORD CARRIER WITH A PREFORMED INFORMATION TRACK FOR RECORDING INFORMATION WITH A RADIATION BEAM

[75] Inventors: Christiaan Steenbergen, Colorado Springs, Colo.; Dirk J. Gravesteijn, Eindohoven, Netherlands

[73] Assignee: U.S. Philips Corporation, New York, N.Y.

[21] Appl. No.: 308,977

[22] Filed: Feb. 8, 1989

Related U.S. Application Data

[63] Continuation of Ser. No. 129,415, Nov. 25, 1987, abandoned, which is a continuation of Ser. No. 906,639, Sep. 10, 1986, abandoned, which is a continuation of Ser. No. 524,730, Aug. 19, 1983, abandoned.

[30] Foreign Application Priority Data

May 9, 1983 [NL] Netherlands ........................ 8301632

[51] Int. Cl.⁴ .............................................. G11B 7/24
[52] U.S. Cl. ..................... 369/275; 369/278; 369/280; 369/286; 369/288; 346/135.1; 430/945
[58] Field of Search ............... 369/275, 277, 280, 283, 369/284, 286, 288, 278, 279; 346/135.1; 430/945; 428/913

[56] References Cited

U.S. PATENT DOCUMENTS

| | | | |
|---|---|---|---|
| 4,020,278 | 4/1977 | Carré et al. | 369/283 X |
| 4,037,251 | 7/1977 | Bricot et al. | 369/283 X |
| 4,285,056 | 8/1981 | Bell | 369/284 X |
| 4,320,489 | 3/1982 | Crandall et al. | 369/275 X |
| 4,336,545 | 6/1982 | Howe et al. | 346/135.1 X |
| 4,340,959 | 7/1982 | Levin | 369/284 X |
| 4,359,750 | 11/1982 | Howe | 358/342 X |
| 4,363,116 | 12/1982 | Kleuters et al. | 369/30 |
| 4,417,331 | 11/1983 | Takaoka et al. | 369/284 X |
| 4,435,801 | 3/1984 | Levin | 369/275 |
| 4,455,632 | 6/1984 | Braat | 369/275 X |
| 4,481,620 | 11/1984 | Murakami | 369/275 |
| 4,491,940 | 1/1985 | Tine | 369/275 X |
| 4,508,811 | 4/1985 | Gravesteijn et al. | 430/945 X |

FOREIGN PATENT DOCUMENTS

| | | |
|---|---|---|
| 0038499 | 10/1981 | European Pat. Off. . |
| 56-145535 | 11/1981 | Japan ................................. 369/275 |
| 58-100248 | 6/1983 | Japan ................................. 369/275 |
| 2084786 | 4/1982 | United Kingdom . |
| 2105094 | 3/1983 | United Kingdom . |

OTHER PUBLICATIONS

Jipson et al., "Squarylium Structures For Optical Recording", vol. 24, No. 1A, 6/81.

*Primary Examiner*—Alan Faber
*Assistant Examiner*—W. R. Young
*Attorney, Agent, or Firm*—Algy Tamoshunas; Leroy Eason

[57] ABSTRACT

A record carrier is described for optically writing and reading information, which record carrier is provided with a pre-formed track. This track is formed by a ridge disposed on the substrate surface and the recording layer comprises a dye layer having such a thickness at the location of the ridge that a write beam can produce a maximum optical effect therein, the dye layer being thicker at locations outside the ridge.

6 Claims, 3 Drawing Sheets

RECORD CARRIER WITH A PREFORMED INFORMATION TRACK FOR RECORDING INFORMATION WITH A RADIATION BEAM

This is a continuation of application Ser. No. 129,415, filed Nov. 25, 1987, which is a continuation of application Ser. No. 906,639, filed Sept. 10, 1986, which is a continuation of application Ser. No. 524,730, filed Aug. 19, 1983, now all abandoned.

The invention relates to a record carrier in which information can be written and which can be read by optical means. Such a record carrier comprises a transparent substrate and a radiation-reflecting recording layer which is deposited on said substrate and which is exposed through the substrate. The substrate surface which adjoins the recording layer is provided with a pre-formed optically detectable track in which information can be written.

The record carrier may comprise a circular disc-shaped substrate with a recording layer in which a radiation beam of sufficiently high intensity can produce an optically detectable change. The pre-formed track extends across the entire record carrier surface. This track is preferably a spiral track, but may alternatively comprise a multitude of concentric track portions.

Such a record carrier is disclosed in U.S. Pat. No. 4,363,116. In the known record carrier the pre-formed track comprises a multitude of concentric or quasi-concentric grooves in the transparent substrate and the recording layer is a thin layer of, for example, Tellurium or Bismuth.

During recording these grooves are employed for detecting the radial position of a radiation spot, formed on the recording layer by a radiation beam, relative to a groove, so that the radial position of the write spot can be corrected. As a result of this, less stringent requirements have to be imposed on the drive and guide mechanism for moving the write beam and the record carrier relative to each other, enabling a simpler and cheaper construction to be used for the write apparatus.

Preferably, the radial position of a radiation spot relative to a groove is detected by means of the "push-pull" or differential method. This method employs two radiation-sensitive detectors arranged in the path of the beam which has been reflected from the record carrier so that the detectors receive radially different portions of the reflected beam. The difference between the output signals of the two detectors contains information about the radial position of the radiation spot relative to the groove. If the output signals are equal, the center of the radiation spot coincides with the center of the groove. The differential tracking method can be used only if the depth of the grooves is such that the phase shift $\phi$ between the radiation reflected from a groove and the radiation reflected from the area surrounding the groove is approximately 90°. This phase shift is given by: $\phi = 4\pi n \cdot d / \lambda$, in which d is the groove depth, n the refractive index of the substrate material and $\lambda$ the wavelength of the radiation used. Moreover, for an optimum tracking signal the amplitude of the radiation reflected from the groove must be equal to that of the radiation reflected from the area surrounding the groove.

These requirements are met if the recording layer is a thin layer of equal thickness both inside the grooves and between the grooves. Such a layer can be formed by vacuum-deposition or by means of a sputter process.

It has been found that layers of specific dyes are very suitable for use as a reflecting recording layer on a pre-grooved record-carrier substrate. Such a dye may be, for example, an alkyl-pyrrylium squarylium compound, which can be deposited by spraying or atomizing a solution of such a compound on the substrate surface. Alternatively, the substrate may be immersed in said solution. A preferred liquid-deposition process is the spinning process, which enables layers of dye of a very small thickness to be obtained in a reproducible manner.

The above deposition methods, which are based on the use of solutions, i.e. of liquids, have great advantages in comparison with a vacuum-deposition process or a sputter process. Contaminants, such as dust particles, can be removed completely, for example by filtration, from the solutions. The dye layer so formed has a high degree of purity. Moreover, a liquid-deposition process can be carried out under normal temperature and pressure conditions. Furthermore, the process can be a continuous process. A vacuum-deposition or sputter process does not have these advantages. In particular the problem of dust constitutes a great disadvantage in the two last-mentioned processes.

When a layer of dye is applied to a pre-grooved record-carrier substrate the grooves are filled completely and the thickness of the layer at the location of the grooves will be greater than that between the grooves. As a result of this difference in layer thickness, which is equal to the groove depth $d_t$, an additional phase shift occurs between the radiation reflected from the recording layer at the location of a groove and radiation reflected from the recording layer in the vicinity of the groove. This additional phase shift gives rise to a differential tracking signal which is no longer optimal.

It is the object of the present invention to provide a record carrier which combines the advantages of the differential tracking method with those of the use of a dye layer for the recording layer. According to the invention, the record carrier is characterized in that the surface of the recording layer which is remote from the substrate is substantially flat and the track is formed by a ridge on the substrate surface.

The invention is based on the recognition that for a specific dye layer and for a specific wavelength of the radiation used, a specific thickness, hereinafter referred to as reflection-neutral thickness, can be determined above which the amplitude and phase of the reflected radiation are substantially independent of the actual thickness of the layer of dye. Moreover, there is a specific thickness of the layer of dye, hereinafter referred to as maximum-effect thickness, for which a write beam produces a maximum optical effect in the dye layer. The maximum-effect thickness is slightly greater than the reflection-neutral thickness. If care is taken that the thickness of the thinnest portions of the dye layer is substantially equal to the maximum-effect thickness, the record carrier is suitable for use of the differential tracking method, and the recording layer is very suitable for optical recording.

The thickest portions of the dye layer are substantially thicker than the maximum-effect thickness. If recording were done in these portions undesired effects may occur, such as the formation of craters. To prevent such effects the recording is on a pre-formed track which has a ridge-shape so that the dye layer has maximum-effect thickness at the location of said track.

As described in U.S. Pat. No. 4,363,116 the preformed track is preferably divided into sectors, each comprising a sector address and an associated blank track portion on which information can be recorded. The sector addresses contain addresses and possibly control information in the form of optically detectable areas which alternate with intermediate areas. By dividing the track into sectors and by assigning an address to each sector a random-access storage disc is obtained. Such control information may be a clock signal.

In accordance with the invention a record carrier with a pre-formed track divided into sectors is characterized in that the areas in the sector addresses are formed by hills situated on the track.

The invention will now be described in more detail, by way of example, with reference to the drawings.

Figure 6:
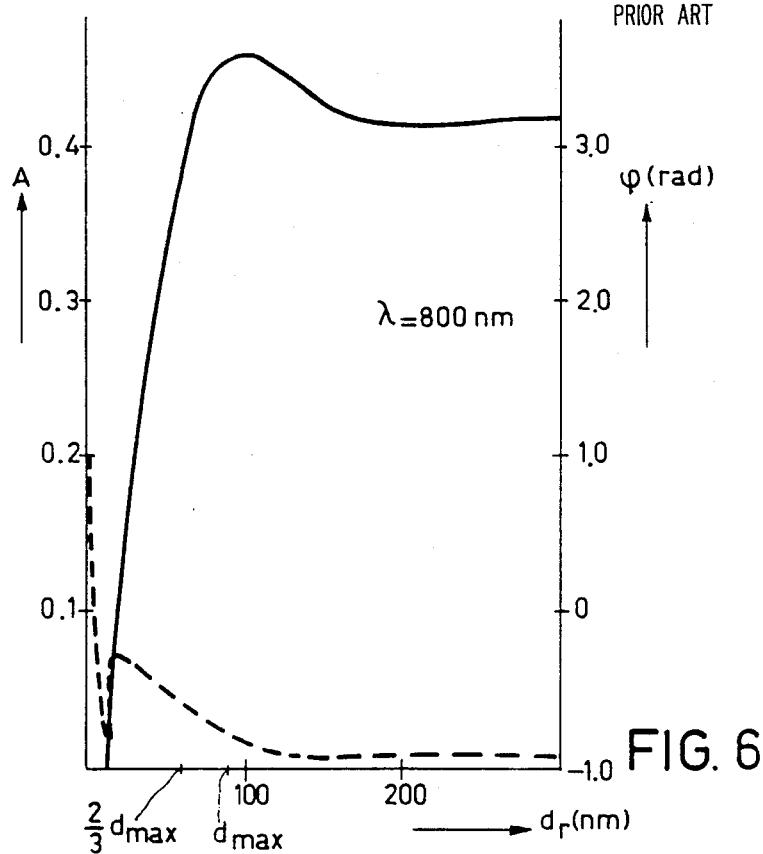
Figure 1B:
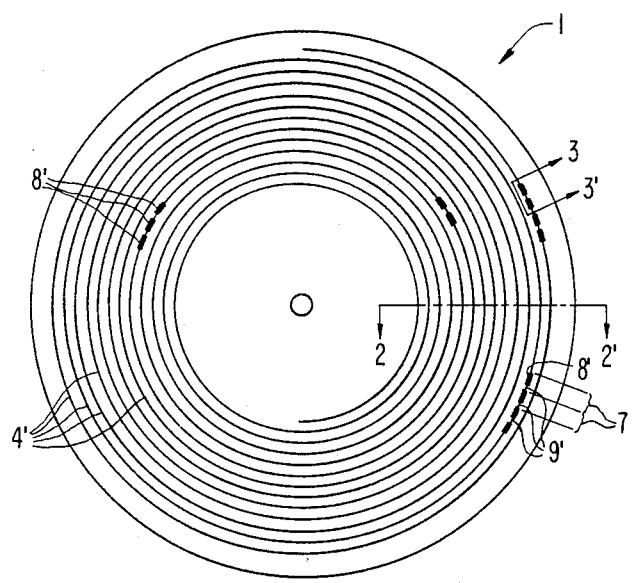
Figure 2:
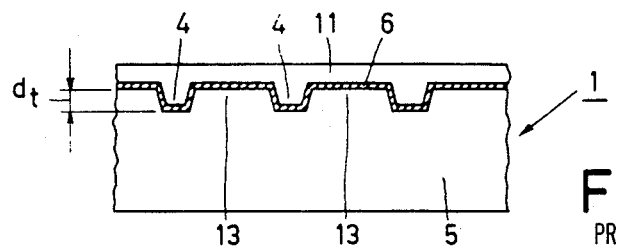
Figure 3:
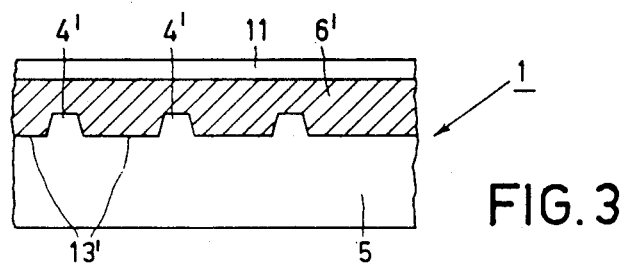
Figure 4:
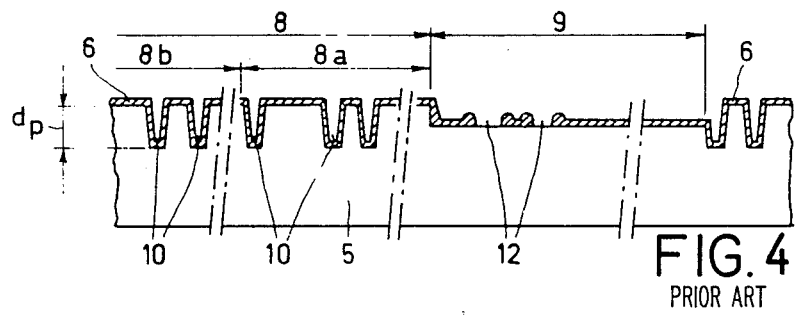
Figure 5:
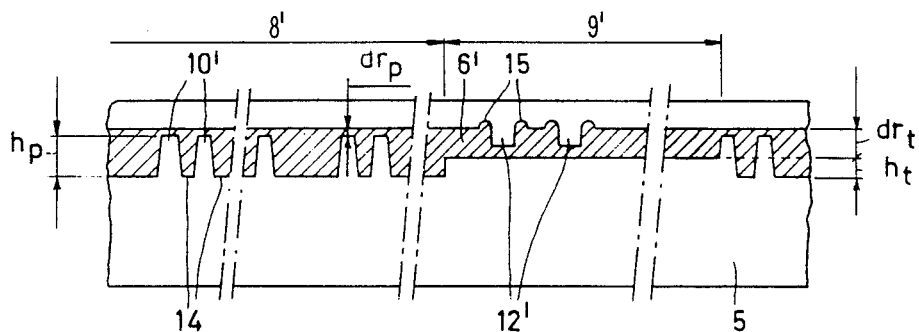

In the drawings:

FIG. 1a is a plan view of a prior art form of record carrier, and FIG. 1b is a plan view of such record carrier as modified in accordance with the invention, FIG. 2 is a radial cross-section of a part of a known record carrier, FIG. 3 is a radial cross-section of a part of a record carrier in accordance with the invention, FIG. 4 is a tangential cross-section of a part of a known record carrier, FIG. 5 is a tangential cross-section of a part of the record carrier in accordance with the invention, and FIG. 6 shows the amplitude and phase of the radiation reflected from a dye recording layer as a function of the layer thickness.

The record carrier 1a shown in FIG. 1 is provided with a pre-formed, for example spiral, track 4. This track may be a continuous track. However, suitably the track is divided into a multitude of sectors 7, for example 128 per track turn. Each sector comprises a blank track portion 9, in which the user can record information, and a sector address 8, in which inter alia the address of the associated track portion 9 is digitally encoded in optically readable areas. Both these areas and the track portions 9 can be detected optically so that, prior to the recording of an information block, the required address can be located and, during recording, a write spot can be kept accurately on the track portion 9. The record carrier 1 is provided with a recording layer which, when exposed to radiation of a sufficiently high intensity, is subject to an optically detectable change.

The method of and the device with which, during the recording of user information, the addresses are read, the track 4 is followed and the user information can be read fall beyond the scope of the present invention and will not be described in more detail. For further information reference is made to the afore-mentioned U.S. Pat. No. 4,363,116 and Netherlands patent application No. 8101932, which has been laid open to public inspection and which corresponds to U.S. Pat. No. 4,546,463.

To enable the record carrier in FIG. 1b accordance with the invention to be compared with the known record carrier in FIG. 1a, the structure of the two record carriers are shown below one another FIGS. 2–5. FIG. 2 shows a part of a known record carrier in a radial cross-section and FIG. 4 shows a part of the pre-formed groove in a tangential cross-section. In FIG. 2 the record-carrier substrate is designated 5. The adjacent portions of the track, which is recessed in the substrate, are designated 4. A thin recording layer 6, made of for example bismuth or tellurium, is deposited on the substrate 5. The track structure may be covered with a protective coating 11. Alternatively, two record carriers as shown in FIGS. 2 and 3 may be secured to each other by means of an interposed annular spacer, which results in a "sandwich" structure which provides an effective protection of the information structures.

FIG. 4 is a sectional view of a known record carrier, taken on the line 3—3' in FIG. 1. Each sector address 8 comprises an address portion 8a and a synchronizing portion 8b. The address portion comprises a plurality of pits 10 of uniform dimensions formed in the substrate. The sequence of pits represents the address information. The synchronizing portions 8b comprise a constant sequence of pits 10 which produce a clock signal, for example for controlling the clock frequency of a signal source which serves for modulating the amplitude of a write signal.

A write beam whose intensity is modulated in accordance with the information to be written can form pits 12 in the recording layer, made of bismuth or tellurium, at the location of the track portion 9, which pits constitute information areas whose reflectivity differs from that of the surrounding area. After the desired information has been recorded by the user, a record carrier is obtained in which the followed track and the sector address therein constitute a phase structure, the user information being recorded in the form of an amplitude structure.

FIGS. 3 and 5 show parts of a record carrier in accordance with the invention in radial and tangential cross-sections similar to those in FIGS. 2 and 4. The recording layer 6' now has a thickness such that the structure formed by the tracks 4' (which include the sector addresses 8' and track portions 9') and the lands 13' between the tracks is entirely covered.

The recording layer is made of a material which can be deposited in a viscous condition after which it is allowed to cure, for example a dye layer, which dye is preferably a pyrrylium or thiopyrrylium-squarylium compound of the formula:

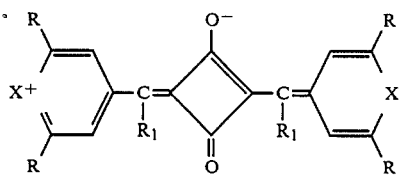

in which

X is an oxygen or sulphur atom,

R is an alkyl group containing at least three carbon atoms, and $R_1$ is a hydrogen atom or a methyl group.

FIG. 6 shows a plot of the amplitude A (represented by the solid line) and the phase $\phi$ (represented by the dashed line) of a laser beam which has been reflected from such a dye layer made of a pyrrylium-squarylium compound as a function of the thickness of the layer. The curves of FIG. 6 apply to reflection from the substrate side of the dye layer. The thickness for which the reflection is a maximum is designated $d_{max}$ in FIG. 6. The Figure shows that for a thickness greater than or equal to $\frac{2}{3} d_{max}$, which thickness $\frac{2}{3} d_{max}$ has been referred to as reflection-neutral thickness in the foregoing, the amplitude and phase of the reflected radiation vary only slightly as a function of the layer thickness $d_r$.

If the track 4' is to be followed by means of the differential tracking method, the thickness variations in the recording layer should not cause additional phase shifts between the radiation reflected from the recording layer at the location of the track and radiation reflected from the recording layer in the vicinity of the track. For a maximum optical effect of a write beam in the recording layer this layer must have a thickness $d_{max}$ to provide a maximum reflection. The write beam is then capable of producing a maximum change in reflectivity. As a result of the great difference in reflectivity between an information area and its surrounding area the signal obtained during reading will be sufficiently large and will have a satisfactory signal-to-noise ratio.

For a layer which is substantially thinner than $d_{max}$ the difference in reflectivity that can be produced by a write beam is substantially smaller than the reflectivity difference corresponding to $d_{max}$. Moreover, the influence of thickness variations in the dye layer, which variations are caused by the fact that the substrate surface is never perfectly flat, is greater. The influence of these thickness variations decreases as the thickness of the layer increases.

For a dye-layer thickness which is substantially greater than $d_{max}$ the write-beam energy is concentrated in the middle of the layer. This energy concentration may become so high that an explosion occurs, so that a hole is formed. Such a hole, referred to as a crater in the foregoing, is not well-defined in shape and size. Moreover, the explosion causes dye particles to settle on the recording layer at a comparatively great distance from the crater. These particles produce noise during read-out. If the thickness of the dye layer is increased further, a bubble is formed in the layer at the location of the write beam. When the bubble bursts, it produces even more serious consequences than the formation of a crater.

In accordance with the invention steps are taken to ensure that the thinnest portions of the recording layer 6' have a thickness which is substantially equal to the maximum-effect thickness and the user information is recorded in these thin portions. It is then still possible to employ a record carrier as in FIG. 1 having a track 4 recessed in the substrate and covered with a dye layer. However, at the location of the track 4 the recording layer will then be thicker than the maximum-effect thickness, namely $d_t + d_{max}$, so that the user information will have to be recorded in the lands 13. This would require the use of two radially adjacent radiation spots, namely a low-intensity spot for scanning the track 4 and a high-energy write spot which travels over the lands 13. However, it is more advantageous to use two tangentially adjacent radiation spots, the front spot scanning the track 4 and recording the information and the rear spot reading the information just recorded. It is even more advantageous to use only one radiation spot whose intensity can be switched between a high (write) level and a low (read) level. This is possible if the preformed track takes the form shown in FIG. 3) of a plurality of ridges 4' on the substrate surface and if the thickness of the dye layer at the location of these ridges is substantially equal to $d_{max}$.

As already stated, the track 4' is preferably divided into sectors comprising sector addresses 8' and blank track portions 9'. In accordance with the invention the areas 10' in the sector addresses comprise hills on the substrate surface, as is shown in FIG. 5 which is a tangential sectional view of a small part of the track 4'.

The areas 10 in the sector addresses of the known record carrier shown in FIG. 4 are read by means of the "central-aperture" or integral read method. In accordance with this method all the radiation reflected by the record carrier and passing through the objective, by which the radiation spot is formed on the record carrier, is received by one radiation-sensitive detector. This read method is based on the phase difference between radiation reflected from an information area and radiation reflected from the vicinity of this area, which difference in phase must be approximately 180°. This means that the difference in level between the areas 10 and the substrate surface must be substantially $\lambda/4.n$. This difference in level $d_p$ should also be maintained between the hills 10' and the substrate surface of the record carrier proposed here.

Since the hills 10' are situated at a higher level above the substrate than the blank track portions 9' the thickness $d_{rp}$ of the recording layer at the location of these hills is substantially smaller than the thickness $d_{rt}$ at the location of the blank track portions. As a result of this, the reflection from the recording layer at the location of the hills 10' is substantially smaller than the reflection from said layer at the location of the intermediate areas 14. The address sectors of the novel record carrier are therefore read by utilizing the difference in reflectivity between the areas 10' and the intermediate areas 14.

When information is recorded by a user, the dye layer 6' is exposed to laser radiation via the substrate 5, the laser-beam intensity being modulated in conformity with the information to be recorded. As a result of this exposure, the dye layer is locally heated to a high temperature. The dye melts and migrates towards the edge of the molten area. Thus, a pit 12' with edge portions 15 is formed in the dye layer 6', as shown in FIG. 5. At the location of the pit 12' the thickness of the dye layer and consequently the reflectivity of this layer is reduced substantially. The pit 12' can be detected using the difference in reflectivity with the surrounding area.

As is known, recording and reading via the substrate has the advantage that contaminants such as dust particles or scratches on the substrate surface fall outside the depth of focus of the objective by which the laser beam is focussed, so that these contaminants do not adversely affect the quality of the recording and read process.

A record carrier with a ridge structure and sector addresses can be formed by manufacturing plastic substrates by means of a mould whose surface is provided with the negative of the ridge structure using processes which are known per se, such as compression-mouling, injection-moulding and transfer-moulding. In the case of a glass substrate an additional skin layer of a plastic may be deposited in which the ridge structure is formed. Such a multi-layered substrate can be manufactured by depositing a layer of a liquid photo-curable lacquer on a mould surface which is formed with a negative of the ridge structure, placing the glass substrate on this layer, curing the lacquer via the substrate, and removing the assembly of the substrate and the cured layer of lacquer, which has adhered to the substrate and in which the ridge structure of the mould is impressed, from the mould surface. A suitable lacquer is a mixture of photo-curable acrylates.

In an embodiment of a record carrier in accordance with the invention which can be inscribed and read with a laser beam emitted by an AlGaAs laser and having a wavelength of approximately 800 nm the substrate is made of glass having a refractive index of approximately 1.5. The recording layer is made of a pentamethin compound. At the location of the ridges 4' the dye layer has a thickness of approximately 85 nm. In the case of a ridge height $h_t$ of approximately 60 nm the maximum thickness of the layer 6' is approximately 145 nm. If the height $h_p$ of the areas 10' is approximately 120 nm the thickness $d_{rp}$ of the dye layer at the location of the areas 10' is approximately 25 nm. The information is recorded with a laser power of approximately 12 mW and with a pulse duration of approximately 50 nsecs. The recorded information pits 12' have a length of the order of 1 μm.

What is claimed is:

1. An optical disc record carrier for storing information which is recorded thereon and read therefrom by a beam of radiation which scans the record carrier during rotation thereof; said record carrier comprising a substrate transparent to such radiation and which has a first planar surface defining an entrance surface for such radiation, a second planar surface opposite said entrance surface, and a plurality of elongated generally parallel ridges projecting from said second surface; each ridge having a top surface spaced from said second surface, said ridges being spaced from each other by lands therebetween which are coplanar with said second surface; and a radiation reflective recording layer extending over said top surfaces of said ridges and over said lands; characterized in that:

each ridge constitutes a track for recording and reading information thereon by a scanning beam if radiation directed through the entrance surface of said substrate which passes through said ridge and scans the recording layer on the top surface thereof in the length direction along such ridge, the reflectivity of said recording layer on said top surface being reduced in areas thereof where the scanning beam incident thereon is of a write intensity, whereby the reflectivity of said recording layer on said ridges varies in the length direction along said ridges in accordance with information recorded on such layer by said scanning beam;

the spacing between the top surface of each of said ridges and said second surface produces a phase difference between radiation reflected from such top surface and from the adjoining lands during scanning by said scanning beam, such phase difference constituting a differential tracking signal for guiding said beam to follow said ridges during such scanning;

said recording layer fills the spaces between said ridges and has a flat surface spaced from the top surfaces of said ridges and which is parallel to said second surface of said substrate, whereby said recording layer is of lesser thickness on the top surface of each of said ridges than on the lands therebetween; and the thickness of said recording layer on the top surface of said ridges is at least equal to a reflection neutral thickness at which a further increase in thickness of such layer will not materially increase the reflectivity thereof, whereby the reflectivity of said recording layer is substantially the same on the top surface of said ridges and on said lands except where information has been recorded on said top surfaces by said scanning beam.

2. An optical record carrier as claimed in claim 1, wherein the thickness of said recording layer on the top surface of each of said ridges is approximately equal to a value $d_{max}$ which exceeds said reflection neutral thickness, and the thickness of said recording layer on said lands exceeds $d_{max}$; the value $d_{max}$ being a thickness of said layer at which a maximum change in reflectivity thereof is produced when the scanning beam incident thereon is of said write intensity in order to record information thereon.

3. A record carrier as claimed in claim 1, wherein said ridges form a multi-turn spiral track on said second planar surface of said substrate, and said top surfaces of said ridges are planar.

4. A record carrier as claimed in claim 2 or 3 wherein each of said tracks is divided along the length thereof into sectors, each sector comprising a blank portion for recording information on such track and an address portion containing prerecorded address and control information in the form of optically detectable areas defined by hills situated on said track which alternate with intermediate areas there-between along the length of said address portion.

5. A record carrier as claimed in claim 1 or 2, wherein said recording layer comprises a squarylium dye and the thickness of said recording layer on the top surface of said ridges is between 50 and 100 nanometers.

6. A record carrier as claimed in claim 5, wherein said dye is a pyrrylium or thiopyrrylium-squarylium compound of the formula

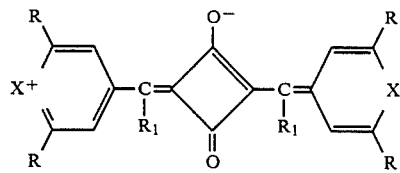

in which X is an oxygen atom or a sulphur atom, R is an alkyl group containing at least 3 carbon atoms, and $R_1$ is a hydrogen atom or a methyl group.

* * * * *